United States Patent
VanderKnyff et al.

(10) Patent No.: US 10,594,746 B1
(45) Date of Patent: *Mar. 17, 2020

(54) CONNECTION SERVICE WITH NETWORK ROUTING

(71) Applicant: Amazon Technologies, Inc., Seattle, WA (US)

(72) Inventors: Christopher Michael VanderKnyff, Seattle, WA (US); Nathan Lee Burns, Mountain View, CA (US); Bin Wang, Fremont, CA (US); Nelamangal Krishnaswamy Srinivas, Sammamish, WA (US); Austin Jay Garbelman, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/870,894

(22) Filed: Sep. 30, 2015

(51) Int. Cl.
*H04L 29/06* (2006.01)
*H04L 29/12* (2006.01)
*H04L 12/741* (2013.01)

(52) U.S. Cl.
CPC .......... *H04L 65/1073* (2013.01); *H04L 45/74* (2013.01); *H04L 61/2007* (2013.01)

(58) Field of Classification Search
CPC ..... G06Q 10/107; H04L 12/585; H04L 12/58; H04L 12/581; H04L 12/5855; H04L 45/00; H04L 47/10; H04L 49/351; H04L 29/0653; H04L 29/06
USPC ....................................... 709/206
See application file for complete search history.

(56) References Cited

U.S. PATENT DOCUMENTS

| | | | |
|---|---|---|---|
| 2005/0053055 | A1 | 3/2005 | Horvath |
| 2006/0072569 | A1* | 4/2006 | Eppinger .......... H04L 29/12009 370/389 |
| 2008/0043760 | A1 | 2/2008 | Venkatraman |
| 2011/0299554 | A1 | 12/2011 | Ros-Giralt |
| 2012/0289147 | A1 | 11/2012 | Raleigh |
| 2013/0117461 | A1* | 5/2013 | Hsu ..................... H04L 63/0209 709/228 |

(Continued)

OTHER PUBLICATIONS

M. Westerlund, SDP and RTSP Extensions Defined for 3GPP Packet-Switched Streaming Service and Multimedia Broadacst/Multicast service, Ericsson, published on Jan. 2011.*

(Continued)

*Primary Examiner* — Mahran Y Abu Roumi
(74) *Attorney, Agent, or Firm* — Knobbe, Martens, Olson & Bear, LLP

(57) ABSTRACT

Systems and methods are described for a connection service that identifies routing paths for providing a data flow between a client computing device and a target computing device. A client computing device can send an API-based connection request to various servers hosting the connection service. The connection service processes the requests to determine a routing path for the connection. Advantageously, the connection service selects a routing path from a plurality of available routing paths if a client computing device is associated with a network address translator. The connection service may provide an externally addressable network address if it determines that no such address is available for routing of a data flow.

17 Claims, 8 Drawing Sheets

(56) References Cited

U.S. PATENT DOCUMENTS

| | | | |
|---|---|---|---|
| 2013/0308628 A1* | 11/2013 | Marueli | H04L 65/1076 370/352 |
| 2014/0026160 A1 | 1/2014 | Shrum | |
| 2014/0223518 A1* | 8/2014 | Feng | H04L 63/0823 726/4 |
| 2014/0282903 A1* | 9/2014 | Singh | H04L 63/08 726/4 |
| 2015/0033300 A1 | 1/2015 | Timariu | |
| 2015/0120841 A1* | 4/2015 | Maria | H04L 65/1016 709/206 |
| 2015/0188902 A1* | 7/2015 | Yoakum | H04L 63/083 726/7 |
| 2016/0050179 A1* | 2/2016 | Wang | H04L 65/1033 726/12 |
| 2016/0149836 A1* | 5/2016 | Narayanan | H04L 51/04 709/206 |
| 2016/0192029 A1* | 6/2016 | Bergstrom | H04L 43/0882 725/109 |
| 2016/0294770 A1* | 10/2016 | Dickinson | H04L 61/2503 |
| 2016/0294913 A1* | 10/2016 | Jansson | H04L 67/02 |
| 2016/0295166 A1* | 10/2016 | Oyman | H04L 65/608 |
| 2017/0085523 A1* | 3/2017 | Chen | H04L 61/256 |

OTHER PUBLICATIONS

Dutton, S., WebRTC in the Real World: STUN, TURN and Signaling, available online http://www.html5rocks.com/en/tutorials/webrtc/infrastructure/, accessed Sep. 7, 2015.

Perreault, S., NAT and Firewall Traversal with STUN / TURN / ICE, © 2008, Viagēnie, http://www.viagenie.ca.

Mahy, et al., Traversal Using Relays Around NAT (TURN): Relay Extensions to Session Traversal Utilities for NAT (STUN), Request for Comments: 5766, Internet Engineering Task Force (IETF), Apr. 2010 (Year: 2010).

* cited by examiner

CONNECTION SERVICE WITH NETWORK ROUTING

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device ("client") and the server computing device can be referred to as a resource provider.

Resource providers are also generally motivated to provide requested resources to client computing devices often with consideration of efficient transmission of the requested resource to the client computing device or consideration of a latency associated with the transmission of the requested resource For larger scale implementations, a resource provider may receive resource requests from a high volume of client computing devices which can place a strain on the resource provider's computing resources. Additionally, the resource requested by the client computing devices may have a number of components, which can further place additional strain on the resource provider's computing resources. For example, the resource can be the data transmission of a video or the like.

Some resource providers attempt to facilitate the delivery of requested resource, such as Web pages or resources identified in Web pages, through various servers stored across a network (e.g., a regional network). In turn, resource providers can instruct, or otherwise suggest to, client computing devices to request some, or all, of a resource through a connection via one of the various servers or via data transmission through a plurality of the various servers.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1:
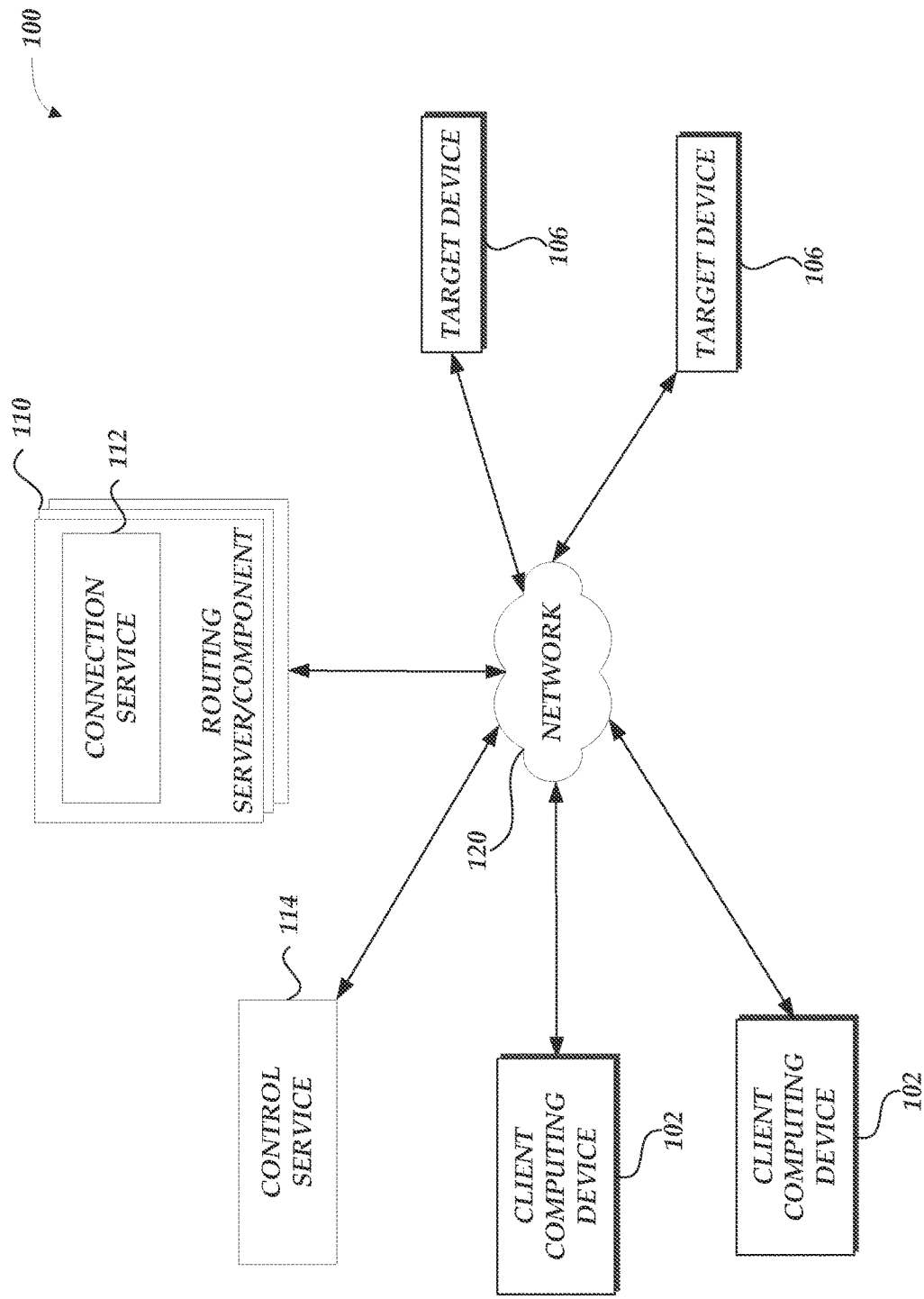
FIG. 1 is a block diagram depicting an illustrative network topology including client computing devices, target computing devices, and routing server/components interconnected via a network, with each routing server/component including a connection service and a control service.

Generally described, the present application relates to connections for data communication and routing thereof. More specifically, aspects of the present application relate to connections for network data communications utilizing a connection service. The connection service identifies connections for transmitting data flows from client devices to target devices, such as a peer device or a client device within a private network. Leveraging application level communications, data communications between multiple computing devices can utilize connections provided by the connection service.

By way of illustrative example, a client requests a resource, with the client being hosted by, or in communication with, a routing server/component configured for a specific service functionality. The routing server/component can use the connection service, at an API level, to identify a connection for that resource associated with the service functionality via the identified connection. For example, if the connection service identifies a connection for a client computing device and a target computing device that uses an arbitrary port at a routing server/component, the connection service can instruct, or otherwise suggest to, the client computing device to provide API level routing information that includes an externally addressable network address of the client computing device. If the externally addressable network address of the client computing device is not readily available, the connection service can obtain an externally addressable network address for the client computing device. For example, the connection service can utilize or interact with a communication protocol that facilitates a determination of an externally addressable network address for the client computing device. For example, the routing server/component can implement communications via the Traversal Using Relays around NAT (TURN) communication protocol or Session Traversal Utilities for NAT (STUN) communication protocol. TURN and STUN are communication protocols for interaction with NATs. STUN may be implemented for interaction with any NAT, except a symmetric NAT. Accordingly, a routing server/component implements STUN so that a client computing device may obtain its externally addressable network address, thereby avoiding use of any masked network addresses that the NAT may have designated for the client computing device. However, a symmetric NAT may not allow a connection to form with a previously unknown routing server/component for that client computing device to obtain its externally addressable network address. In such a case, a routing server/component may implement TURN to allocate an externally addressable network address for the client computing device, and then communicate that externally addressable network address to the client computing device. As can be seen, such protocols (e.g., STUN and TURN) can allow interaction with a NAT associated with a client computing device hosted by the routing server/component in a private network. For example, the connection service can request externally addressable network addresses for the client computing device and the target computing device.

With the connection service operating on each server, each server can be viewed or referred to as a network control point. Accordingly, each server, regardless of the service functionality hosted by a certain server, can identify connection within the network topology to provide a data flow to a target device associated with a server having a different service functionality than the server associated with the client computing device requesting a data flow. As used herein, a server configured for difference service functionality can be a server that hosts a service facilitating a particular functionality. For example, a storage service hosted on a storage server can uses storage volumes to produce storage processing results for some aspect of storage functionality. A storage server can provision certain storage volumes for use by a customer of a data center. Continuing in the example, that storage server can be associated with the target device, with that storage server operating as node of the connection providing a data flow to the target device. As can be seen, operating in real-time, servers can use the connection service to dynamically route traffic on identified connections. In contrast, in traditional network communication systems, resources are often delayed due to network conditions and transport/routing protocols that may require lengthy packet headers or redundancy to deliver a real-time, interactive, or streaming resource. However, with the systems and described here, a connection service can identify a connection and determine a routing path for that connection at an API-level by leveraging servers with varying functionalities. In addition, such servers can operate the connection service at the API-level while still having the functionality to which that server is configured.

The connection service can further determine a routing path for the connection to transmit a data flow through a plurality of servers configured with different service functionalities. The connection service communicates with such servers at the API level, where route requests can be made by a requesting server and routing information obtained from those servers with different functionalities. Generally speaking, an API-level request can include connection requests, data stream initiation requests, and connection processing results, transmitted at the API-level via a connection plane or a control plane. As an example, a routing server/component, implementing the connection service, can determine that a client computing device is associated with a symmetric NAT based on information from a connection request. In such an instance, the connection service can determine that a routing path for interacting with a symmetric NAT is to be used to transmit a data flow from the client computing device to the target device. As used herein, a server configured for specific service functionality can be a server that hosts a service facilitating a particular functionality. For example, a storage service hosted on a storage server can uses storage volumes to produce storage processing results for some aspect of storage functionality. More specifically, a storage server can provision certain storage volumes for use by a customer of a data center.

In other aspects, the present disclosure relates to a connection service that analyzes API routing information to determine the routing path for the connection. The connection service utilizes the API across a network topology (e.g., a regional network), with a server hosting the target device responding at the API level with API routing information. As but one example, the connection service utilizes API to identify and configure the connection for a real-time, interactive, or streaming data flow transmission between the client computing device and the target device, using a server with any service functionality to operate as network control point for that connection. With such API routing information available to the connection service, the connection service can operate at an API level on each server to identify various real-time, interactive, or streaming data flow connections in a distributed network topology. As used herein, a data flow can be defined in terms of a set of network addresses (source and destination), a communication port, and a specified protocol. For example, the set of network addresses can be an externally addressable network address. Such an externally addressable network address can be addressed with a data flow by various entities in a network topology. A data flow can also be referred to as a data stream. As used herein, API routing information may refer to routing information received or transmitted at an API-level, or may refer to API-based routing information.

As used herein, resources can include a resource capable of real-time, interactive, or streaming interaction such as a high-definition video conference, a voice conference, or a remote viewing session such as via a Remote Desktop Protocol (RDP) session. For example, in one embodiment, a VPN server can transmit an API request regarding an RDP application to a target computing device. The API request can include a destination IP address of the client associated with the VPN server and an arbitrary port for providing the RDP application. In another embodiment, a resource capable of a data flow can be referred to as a real time resource, for example, a real time resource for real time interactions.

The foregoing aspects and many of the attendant advantages will become more readily appreciated as the same become better understood by reference to the following description of illustrative embodiments, when taken in conjunction with the accompanying drawings depicting the illustrative embodiments. The illustrative embodiments described below do not necessarily imply that any combination of features is required. Additionally, in some embodiments, the features of the illustrative embodiments can be combined.

FIG. 1 is block diagram depicting an illustrative network topology 100 including client computing devices 102, target computing devices 106, routing server/components 110 interconnected via a network 120 and a control service 114, with the routing server/components 110 including a connection service 112.

Client computing devices 102 may generally include any computing device transmitting or receiving resource requests through the network 120. While the term "client" is used in reference to client computing devices 102, client computing devices 102 should not be construed as limited to end user computing devices. Rather, client computing devices 102 may include end user devices, devices owned or operated by other service providers, or devices owned or operated by an administrator of (e.g., a data center operator) a routing server/component 110. Examples of client computing devices 102 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

In like fashion, target computing devices 106 can be any computing device that may a client computing device 102. As used herein, a target computing device 106 is meant to construe that the target computing devices 106 is the "target" of some transmission, for example, a resource transmission.

From a different viewpoint, target computing device 106 may be the "target" of a resource request from a client computing device 102. In various embodiments, target computing devices 106 may be associated with a different local network of network topology 100 than the local network of client computing devices 102. For example, target computing devices 106 can be associated with a storage network hosted by a routing server/component 110 facilitating storage services; while client computing devices 102 can be associated with a private network hosted by a routing server/component 110 facilitating VPN services.

Routing server/component 110 can be any server configured for specific service functionality. As an example of a routing server/component 110 hosting a service facilitating a particular functionality, the routing server/component can be a VPN server that is a host for private enterprise network within network topology 100. Such a VPN server can have multiple client computing devices 102 associated only with that VPN server. The VPN server may manage the IP addresses of those client computing devices 102. For example, in one embodiment, the VPN server can mask a private IP address of a particular client computing device 102, so that, to the network 120, only a public IP address appears for that particular client computing device 102, rather than the actual private IP address of that client computing device 102. In addition, using the methods and techniques disclosed herein, such a VPN server can set up a connection for transmission of a data flow between the client computing device 102 of the private enterprise network and another network component in the network topology 100. For example, the VPN server can set up a secure data flow with API credentials between a private client computing device 102 and a target computing device, for example, a target computing device that provisions a storage volume associated with another routing server/component 110.

As another example of a routing server/component 110 hosting a service facilitating a particular functionality, the routing server/component 110 can be a routing server/component 110 that hosts a storage network within network topology 100. Not depicted in FIG. 1, the network topology 100 can also include multiple host computing devices with multiple sets of client computing devices 102 that communicate with the virtual machines via network 120. Such multiple host computing devices and associated client computing devices 102 may be associated with such a storage server. Illustratively, the client computing devices 102 associated with that storage server can use virtual machines to access storage volumes via network 120. Accordingly, a storage volume can be provisioned for attachment to virtual machines as storage resource for a client computing device 102.

As yet another example of a routing server/component 110 hosting a service facilitating a particular functionality, the routing server/component 110 can be a CDN server 115 communicating with client computing devices 102 and content providers (not depicted in FIG. 1) via the network 120. Such a CDN server may correspond to a logical association of one or more computing devices associated with a CDN service provider. Specifically, that CDN server can include a number of point-of-presence ("POP") locations that correspond to nodes on the network 120. POPs can be geographically distributed throughout the network 120. In one embodiment, the network 120 represents a regional network for a particular geographical region (e.g., US West Coast). Additionally, one skilled in the relevant art will appreciate that such a CDN server can be associated with various additional computing resources, such additional computing devices for administration of content and resources, and the like.

Additionally, a routing server/component 110 can relay connection requests or data flow initiation requests to other routing server/components 110 in network topology 100. For example, routing server/component 110 configured as a storage server can relay connection requests for real-time, including interactive or streaming, interactions for another routing server/component 110, which may be configured as a VPN server. For example, a request for real-time, including interactive or streaming, interactions can be a request for a remote viewing session implemented by Remote Desktop Protocol (RDP) on a client computing device 102 associated with a private network of that other routing server/component 110 configured as a VPN server. The RDP session can allow the client computing device 102 to interact with a remote desktop application or service to provide a network-based computing session to the client computing device 102.

The network 120 also is operable to enable communication between various components of the network topology 100 such as communication between client computing devices 102, various routing server/components 110, the control service 114, and target computing devices 106. The network 120 may be, for instance, a wide area network (WAN), a local area network (LAN), or a global communications network. Network 120 can enable communication between any components depicted in network topology 100. Network 120 can be the network of a data center, operated by a certain network provider. Or network 120 can be a public regional network, with aspects of network 120 being operated by different providers.

As depicted, each routing server/component 110 of network topology 100 can have a connection service 112 associated with that routing/server component 110. In other embodiments, each connection service 112 of the various routing server/components 110 may operate collectively communicating via network 120.

The connection service 112 can utilize an API across a network topology with each routing server/component 110 encapsulating API requests or API routing information at the API-level, while still operating with a communication protocol for routing of the API requests. For example, the connection service 112 can be configured to operate with a communication protocol having a set of rules regarding IP address assignment. Accordingly, the connection service 112 can interact with Network Address Translators ("NATs") using the set of rules regarding IP address assignment. In various embodiments, the Traversal Using Relays around NAT (TURN) protocol or Session Traversal Utilities for NAT (STUN) protocol can be the communication protocol used with the connection service 112. Such protocols can be used to interact with a NAT. For example, the STUN protocol can be used to by a routing server/component 110 to traverse a NAT: a routing server/component 110 operating the STUN protocol can obtain public IP addresses and relay those addresses back to client computing devices operating 102. In turn, a client computing device 102 receiving that public IP address can use it as a client identifier for communication to another peer in network topology 100, for example, a target computing device 106 operating as a peer. Generally, any communication protocol that can associate addresses of client devices for public or private use can be used as a communication protocol with the connection service 112. A public IP address can be referred to as an externally addressable network address.

Aspects of the connection service 112 interacting with the components of network topology, such as identification of a connection for client computing device 102 and target computing device 106 and determining a routing path for that connection, will be described further below with reference to FIGS. 3-4B. Viewed from one perspective, connection service 112 can be seen as operating a signaling layer. Such a signaling layer can also be referred to as a signaling plane. For example, connection requests from client computing devices 102 can be seen as signals to the connection service 112 that a connection is to be set up. In addition, connection service 112 may also receive information at the signaling layer from other routing server/components 110 regarding NATs associated with the respective client computing devices associated with each routing server/component 110. Accordingly, any information from the signaling layer can be utilized by connection service 112 to identify connections for data flows. Data flows for that connection may operate on a different layer, for example, a data layer (e.g., a data plane) that may be controlled by the control service 114.

The control service 114 facilitates control messages regarding data flows on identified connections between a client computing device 102 and a target computing device 106. Illustratively, the control service 114 may include a number of hardware and software components. More specifically, the control service 114 may include hardware, software, configuration data, data structures, computer-readable code, or any type of information that can be loaded into memory and processed or published by the control service 114. In various embodiments, reference to the control service 114 within the present disclosure may include multiple computing devices working in conjunction to facilitate control messages at a control layer.

While depicted illustratively in FIG. 1 as stand-alone component, control service 114 may reside as a service according to various implementations. For example, in various embodiments, the control service 114 may be distributed through a network across various routing server/components 110. Additionally or alternatively, it can be appreciated by one skilled in the art that the connection service 112 and control service 114 may correspond to a combination thereof and/or include any other services, be centralized in one computing device, and/or be distributed across several computing devices.

Each routing server/component of network topology 100 can access the control service 114 via network 120. The control service 114 can operate at a control layer (e.g., a control plane) to send control transmissions regarding the data plane or data flows. The control service 114 can operate the control layer for communicating or relaying data flow requests between client computing devices 102 and target computing devices 106. Aspects of the control service 114 interacting with a client computing device 102 and a target computing device 106, such as requesting initiation of a data flow, will be described further below with reference to FIG. 4C.

Figure 2:
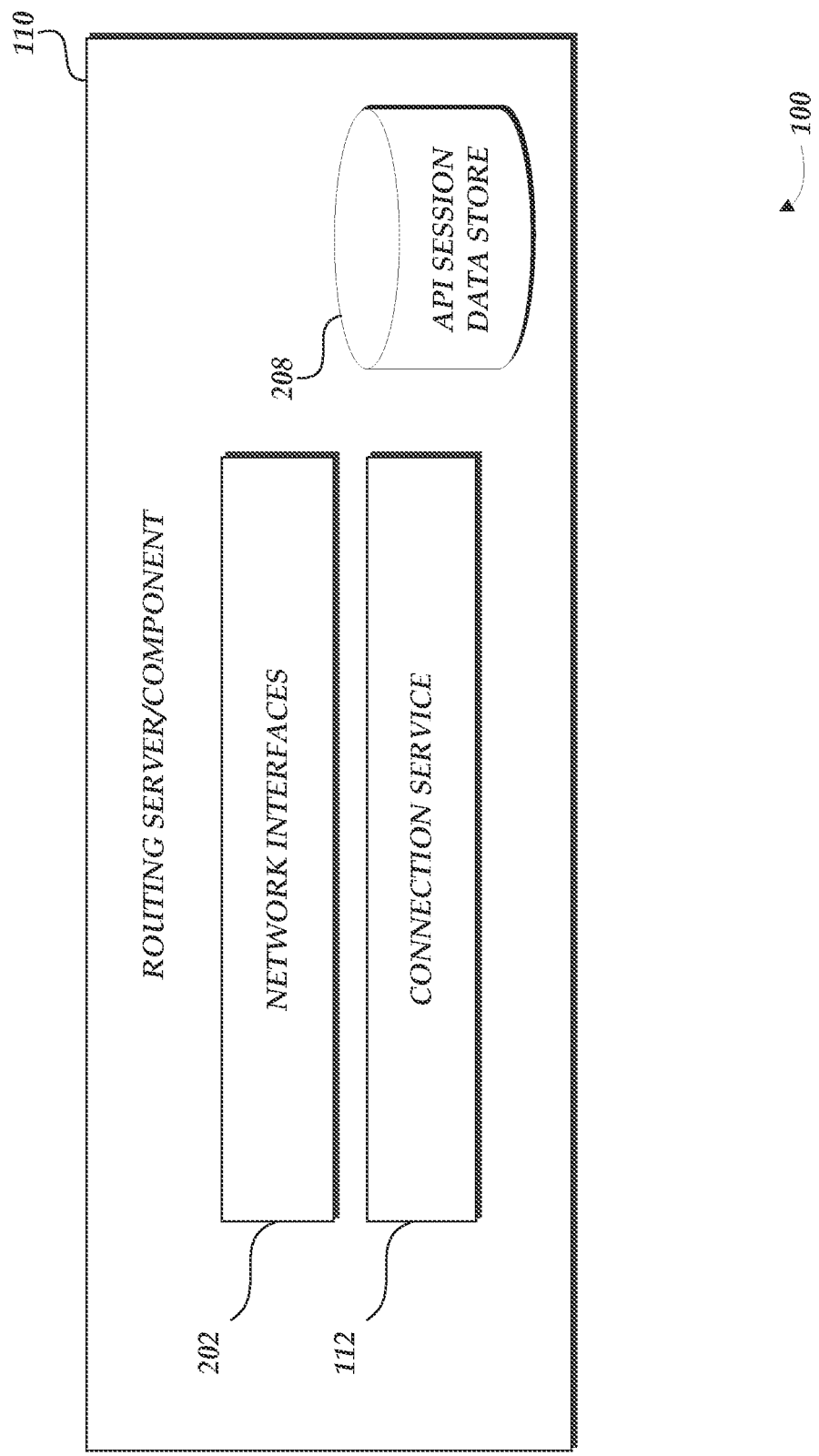
FIG. 2 is a block diagram depicting illustrative components of a routing server/component included within the network topology of FIG. 1.

FIG. 2 is a block diagram depicting illustrative components of a routing server/component 110 included within the network topology 100 of FIG. 1. The routing server/component 110 includes network interfaces 202 for receiving API routing information from other routing/server components 110 or for receiving connection requests from client computing device 102. In various embodiments, network interfaces 202 can receive data initiation request and data initiation acknowledgments from client computing devices 202 and target computing devices 106 respectively. In other embodiments, connection requests, data flow requests, or API routing information can be received by network interfaces 202 from other network entities in network 120. For example, not depicted in network topology 100, network interfaces 202 can receive a connection request from a storage volume hosted on a routing server/component 110 configured as a storage server. The routing server/component 110 further includes the connection service 112 configured to operate with functionalities described herein, for example, with respect to FIGS. 3, 4A, 5, and 6.

Illustratively, the connection service 112 may include a number of hardware and software components. More specifically, the connection service 112 may include hardware, software, configuration data, data structures, computer-readable code, or any type of information that can be loaded into memory and processed or published by the connection service 112. In various embodiments, reference to the connection service 112 within the present disclosure may include multiple computing devices working in conjunction to facilitate the identification of a connection between a client computing device 102 and a target computing device 106 via one or more routing server/components 110. For example, in various embodiments, the connection service 112 may be distributed through a network across various routing server/components 110.

API session credentials and API routing information can be stored in API session data store 208, also included in routing server/component 110. API session data store 208 can additionally include data about any network entity registered as part of the API in network topology 100. The network interfaces 202 may refer to a physical communication interface on a physical computing device. The network interfaces 202 may be an electrical communication interface, an optical communication interface or other type of interconnect interface known in the art. The network interfaces 202 may be configured to provide communications between units within the routing server/component 110 (e.g., the connection service 112) and the client computing devices 102, which may be hosted by a particular routing server/component 110. Illustratively, the configuration of the network interfaces 202 may be optimized based on specific criteria, such as low latency, high speed, and high bandwidth, among others. In some embodiments, the interconnect interface may correspond to a high speed serial computer expansion bus, such as a Peripheral Component Interconnect Express (PCIe) bus. One skilled in the relevant art will appreciate that the network interfaces 202 may incorporate alternative or additional standard interconnect interfaces well known to those skilled in the art.

Figure 3:
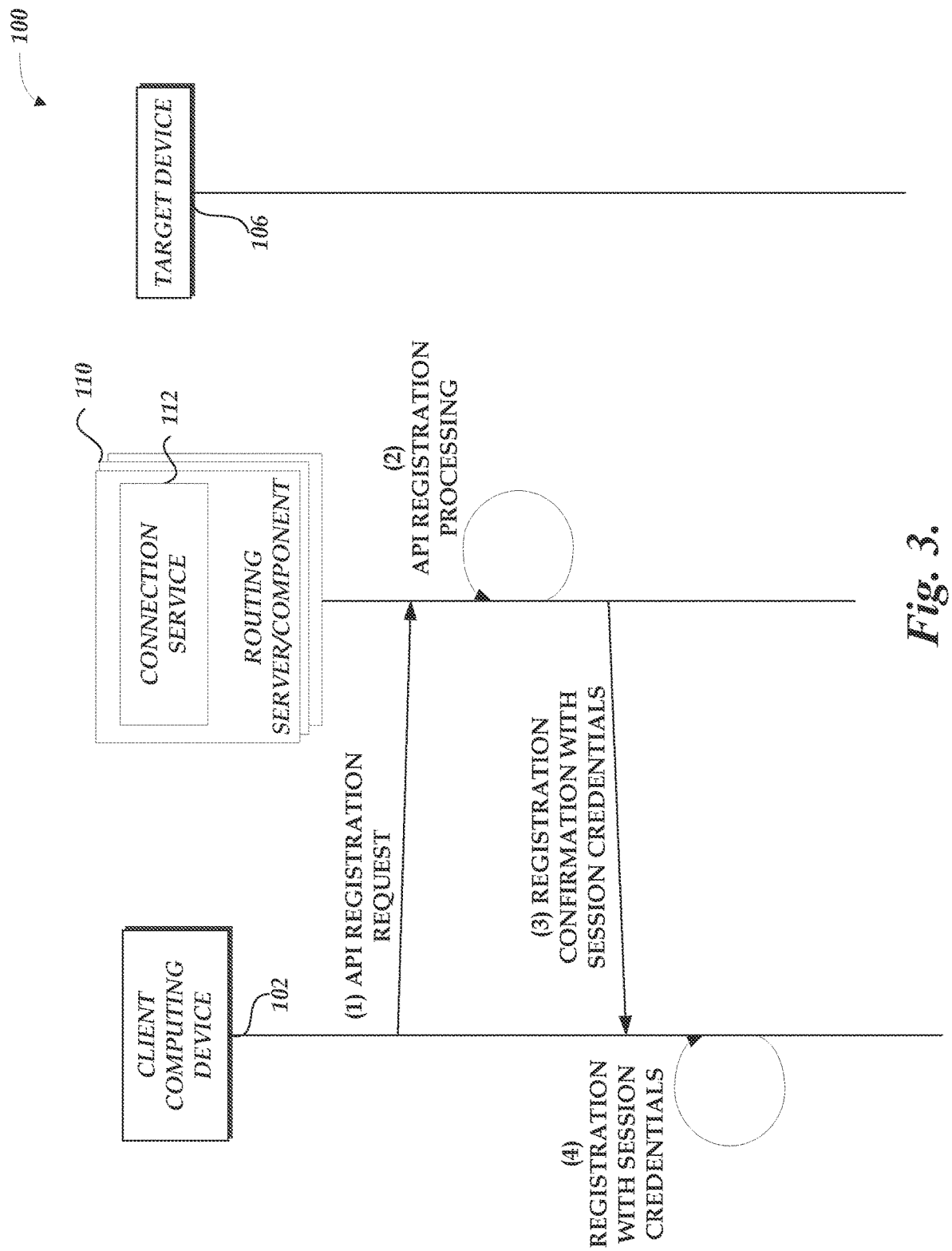
FIG. 3 is a block diagram of the network topology of FIG. 1 illustrating application-programming interface (API) registration.
Figure 4A:
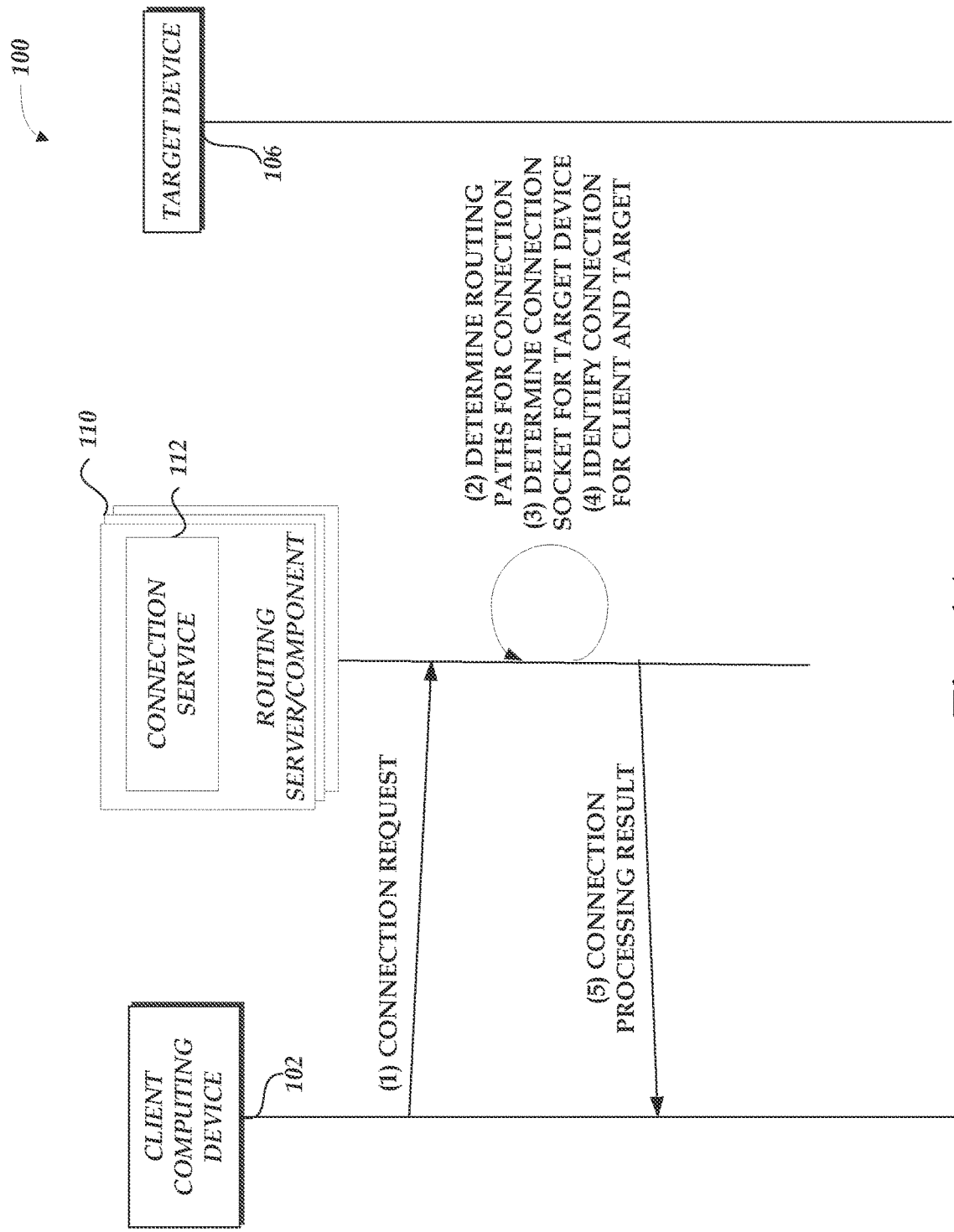
FIG. 4A is a block diagram of the network topology of FIG. 1 illustrating transmission of and processing of a connection request from a client computing device by a routing/server component in the network topology.
Figure 4B:
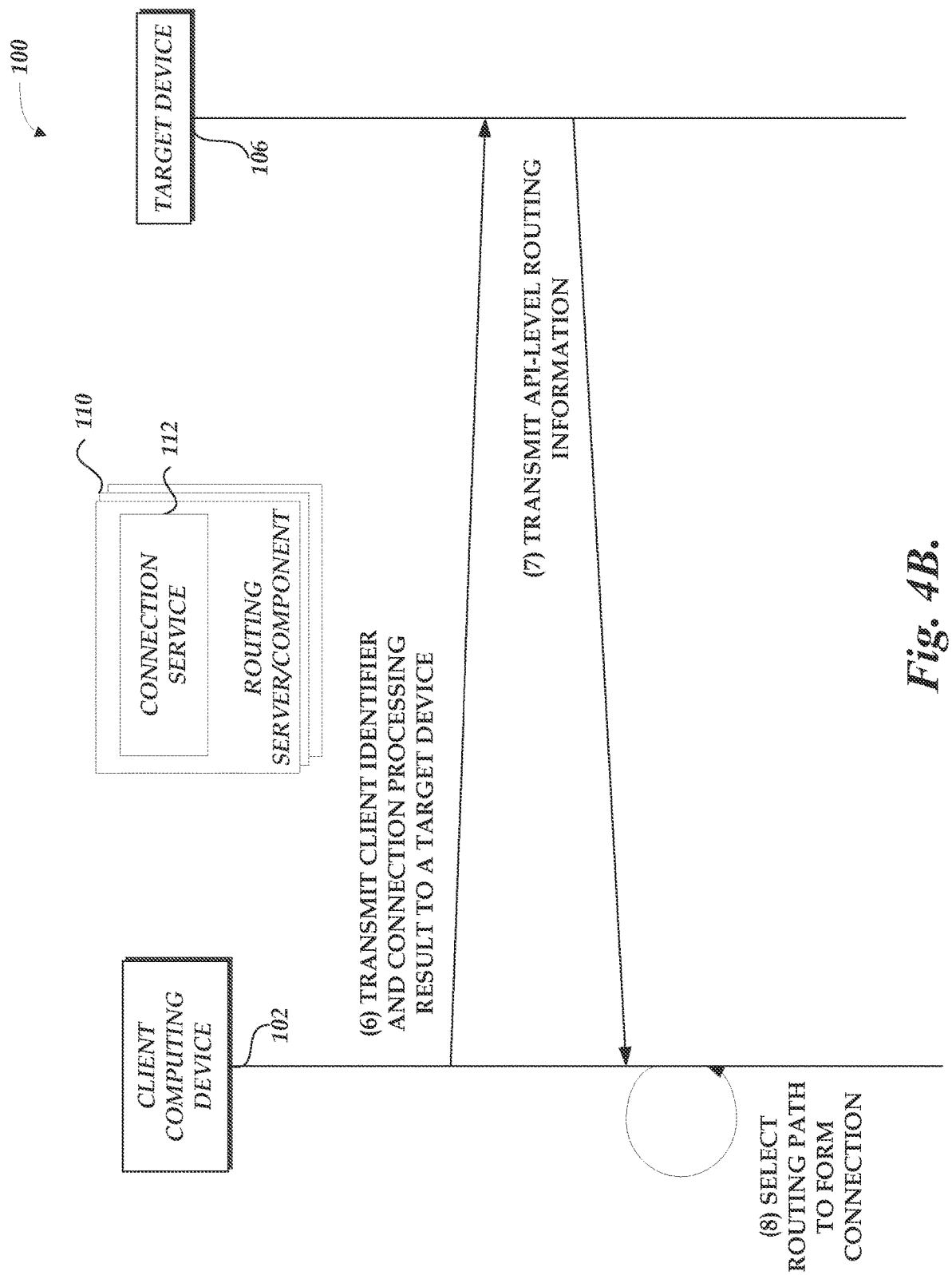
FIG. 4B is a block diagram of the network topology of FIG. 1 illustrating processing of a connection processing result by a client computing device to select a routing path for an identified connection.

With reference now to FIGS. 3-4B, the interaction between various components of the network topology 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

FIG. 3 is a block diagram of the network topology of FIG. 1 illustrating application-programming interface (API) registration within the network topology of FIG. 1. As illustrated in FIG. 2, the API registration process for connection service 112 begins with registration of the client computing device 102 with the routing server/component 110. For example, the registration API can include a request for a public IP address and a port number for accessing the connection service 112 or control service 114. For example, the client computing device 102 may request a public IP address if the client computing device 102 is on a private network, in which case, the client computing device 102 may be hosted by a routing server/component 110 configured as a VPN server. Although control service 114 is not shown in FIG. 3, the API registration process depicted in FIG. 3 for connection service 112 may also be utilized for API registration of the control service 114.

As will be described further with reference to FIG. 4A below, with the client computing device 102 now having a public IP address and a port number for accessing the connection service 112, the routing server/component 110 can begin to receive connection requests from the client computing device 102, and, once a data flow is initiated by connection service 112 on behalf of client computing device 102, data flow transmissions can be relayed by one or more routing server/components 110 to target computing device 106. Specifically, in accordance with aspects of the connection service 112, a resource to be provided by client computing device 102 would eventually be routed or relayed to the target computing device 106 via a connection identified by the connection service 112. Or, in an embodiment not depicted, a resource may be routed to a POP associated with a routing server/component 110 configured as a CDN server.

With continued reference to FIG. 3, upon receiving the registration API, the routing server/component 110 obtains and processes the registration information at (2). In the depicted embodiment at (3), the routing server/component 110 can then generate registration confirmation with session credentials. Once received at client computing device 102 at (4), client computing device 102 processes the registration with the session credentials. From one perspective, this can be viewed as an API session startup between client computing device 102 and routing server/component 110. This can allow the various connection services 112 distributed across the routing server/components 110 to interact at the API-level, such as by receiving connection requests from client computing devices 102, described further below with respect to FIG. 4A. Accordingly, the various routing server/components 110 can be seen as associated with a common connection service 112, with each routing server/component 110 having session credentials for interaction with the connection service 112. Any one of the various routing server/components 110 can receive API-level requests, such as a connection request from a client computing device 102. Similarly, the control service 114 can be viewed as a common control service 114, with the session credentials at each routing server/component 110 validating access to the control service 114 for facilitating control messages regarding data flows.

In various embodiments, session credentials may include a session identifier allowing identification of API requests and routes with a particular session. A session identifier can indicate other routing server/components 110 registered with the same API. Illustratively, using a session identifier, a routing server/component 110 configured as a VPN server can identify other servers with same session credentials. For example, routing server/component 110 configured as CDN server can have the same session credentials, which can allow the respective connection services 112 at each of those servers to interact at the API-level. One skilled in the relevant art will appreciate that various types of session credentials may be generated by the routing server/component 110 and that the session credentials may be embodied in any one of a variety of formats. For example, the session credentials can be included in metadata as specified by a communication protocol.

FIG. 4A is a block diagram of the network topology 100 of FIG. 1 illustrating transmission of and processing of a connection request from a client computing device 102 by a routing server/component 110 in the network topology 100. At (1), client computing device 102 transmits a connection request via network 120 to the routing server/component 110. For example, client 102 can transmit a connection request through a browser operating on client 102. In this example, the connection request can be a request for a video chat, such as a real-time or interactive session, with a browser operating on target computing device 106. More generally, the connection request for a connection can be a connection for a data flow from a browser of client computing device 102 to a browser of target computing device 106. For example, any real-time, interactive, or streaming communications between such browsers can be communicated via the Web Real Time Communications ("WebRTC") API protocol. That is, an API-level resource request can be transmitted corresponding to a WebRTC connection request. As examples of WebRTC connection requests, RTCPeerConnection can initialize audio or video calls; and RTCDataChannel can allows browser to share real-time, interactive, or streaming data. As one example of a RTCDataChannel request, a browser can request that another browser share the desktop or operating screen of the other browser. Generally, the connection request can be a WebRTC offer. The offer can include various parameters including, but not limited to: a type of offer, a variation in the buffer size of the data flow to be connected, a size of the data flow to be connected, or a parameter indicating that the buffer is to be emptied. For example, a protocol may specify that an offer, encapsulating a WebRTC offer, include: sdp_property, sdpType_property, sctpSendBuffer_property, sctpReceiveBuffer_property, and sctpAlwaysDry_property. An sdp_property can be a string representation of a WebRTC SDP offer. An sdpType_property can be a string representation of the SDP offer type. An sctpSendBuffer_property can be an integer representing a buffer size. If the target device supports overriding its SCTP send buffer size, it is advised to override the buffer size to at least this value. An sctpReceiveBuffer_property can be integer representing a buffer size. If the target device supports overriding its SCTP receive buffer size, it is advised to override the buffer size to at least this value. An sctpAlwaysDry_property can be a Boolean value. If the target device supports overriding its data channel send behavior and this value is true, it should begin draining the WebRTC send buffer into its SCTP send buffer upon receipt of any SCTP stream ACK. Prior to an offer, a client computing device 102 may also send a HELLO message to the target computing device 106. A HELLO message can informs an idling routing server/component that its peer has arrived.

At (2), the connection service determines a routing path for a connection between the client computing device 102 and the target computing device 106. To determine the routing path, the connection service 112 can access API level routing information to determine whether public IP addresses of the respective devices are available. For example, the connection service 112 can have access to the API routing information for the various routing server/components 110, the target computing devices 106, and the client computing devices 102. Such access can be obtained when any network component of network topology 100 is associated with API session credentials. Accordingly, the connection service 112 can obtain a public IP address for the target computing device 106. Similarly, the client computing device 102 can have a public IP address obtained from the API session credentials. In such a case, the client computing device 102 and the target computing device 106 can be referred to as peers such as in a peer-to-peer network topology. Accordingly, in this example, the determined routing path corresponds to a peer-to-peer routing path. A determined routing path can also be referred to as a routing mode.

Other routing paths can be determined at (2). As another example, the connection service 112 may not receive API routing information from either the client computing device 102 or the target computing device 106. Illustratively, a client computing device 102 may not provide a public IP address if the client computing device 102 is associated with a NAT. In such a case, the routing/server component 110 can utilize or interact with a communication protocol that facilitates a determination of an externally addressable network address for the client computing device 102. For example, the routing server/component 110 can implement communications via the TURN communication protocol or Session Traversal Utilities for NAT ("STUN") communication protocol. Such protocols can allow interaction with a NAT associated with a client computing device 102. As an example, the routing/server component 110 implementing the STUN protocol can indicate, to the client computing device 102, the public IP address that the associated NAT has provided via the API connection request of the client computing device 102. Accordingly, in this example, the determined routing path can be a routing path for interactions with a NAT.

As another example of when the connection service 112 may not receive API routing information from either the client computing device 102 or the target computing device 106, the routing/server component 110 can implement the TURN protocol to allocate a specific pubic IP address for the client computing device 102. This may be a protocol to utilize when the NAT associated with the client computing device 102 is a symmetric NAT. A symmetric NAT may be used by a client computing device 102 having a private network with a higher security level. For example, the client computing device 102 may be associated with a VPN network. In such a case, the routing server/component 110 implementing the TURN protocol can additionally allocate a specific public IP address for the target computing device 106. In turn, the client computing device 102 can provide that the public IP address to the connection service 112 when the client computing device 102 transmits an additional API connection request, for example. Accordingly, in this example, the determined routing path can be a routing path for interactions with a symmetric NAT.

In various embodiments, the routing server/component 110 can use the techniques and methods described with respect to the STUN and TURN protocols to obtain a public IP address for the target computing device 106 similarly as described with respect to the client computing device 102 herein.

At (4), the routing server/component 110 determines a connection socket for the target computing device 106. The connection socket can be located at the routing server/component 110. A connection socket can include an arbitrary port for an application of the client computing device 102 and an address for the client computing device 102. As used herein, an arbitrary port can be any network endpoint for a computing service or process facilitated by a computing device. For example, an arbitrary port can be associated with an application for a service. Accordingly, the connection service 112 can determine, as part of the determination process for a connection socket, a port number to be used as a connection for facilitating the connection between the client computing device 102 and the target computing device 106.

The service facilitated by the connection service 112 can be a real-time, interactive, or streaming data flow service communicated at the API level. For example, an RDP application operating on a client 102 can be associated with an arbitrary port for a data flow service that provides the RDP application to the target computing device 106. As another example, an HTTP application (e.g., a web browser) on a client 102 can be associated with that same arbitrary port for the data flow service, to provide the HTTP application. Or in another embodiment, the HTTP application on the client 102 can be associated with a different arbitrary port for an additional data flow of the data flow service, thereby providing higher throughput of resources (e.g., applications) provided by the client computing device 102 to the target computing device 106. In one embodiment, the HTTP port can correspond to port 80 as specified by the Transport Control Protocol (TCP). Various ports are available having different services. As non-limiting examples, other ports can be associated with Simple Mail Transport Protocol (SMTP) and File Transport Protocol (FTP).

At (4), in addition to determining an arbitrary port, the connection service 122 determines the public IP address of the client computing device 102 to determine the connection socket for connection. The connection service determines the address for the client computing device 102 using public IP address is obtained from the API level routing information (e.g., as peer devices described above) or from information obtained in the determination process of the routing path for the connection. As an example of the latter, the connection service 112 can access and leverage the obtained public IP address using the STUN protocol to determine the connection socket for the client computing device 102. Or, the connection service 112 can access and leverage the allocated public IP address using the TURN protocol to determine the connection socket for the client computing device 102.

Continuing in the depicted embodiment of FIG. 4A, the routing server/component 110, at (4), the connection service 112 identifies a connection for the client computing device 102 and the target computing device 106. In various embodiments, the connection service 112 utilizes the determined connection socket and the API session credentials for identifying an API-based connection between the client computing device 102 and the target computing device 106. For example, if, as described above, both public addresses are available to the connection service 112 from API routing information received both from the client computing device 102 and the target computing device 106, the connection service 112 can determine that the available public addresses correspond to peer devices. As used herein, peer devices are any client computing devices 102 or target computing devices 106 that readily broadcast their respective public IP address, without utilizing a routing protocol configured to interact with NATs. With this determination and the public addresses of each device, the connection service 112 can determine that the connection between the client computing device 102 and the target computing device 106 includes the determined connection socket. Accordingly, the connection service 112 can identify that the connection can be made as an API based connection using this connection information. In various embodiments, a WebRTC offer can include other parameters regarding the connection that can vary the properties of that connection. The connection service 112 can use these parameters to identify an API-based connection with parameters specified by that offer.

As another example of identifying the connection between the client computing device 102 and the target computing device 106, the connection service 112 can determine that a public address of the client computing device 102 is not available to the client computing device 102. For example, the connection service 112 can determine that API level routing information obtained from the client computing device 102 did not include a public IP address. Or, in other embodiments, the connection service 112 may not have obtained API level routing information from the client computing device 102. In such cases, the connection service 112 can request information obtained from the routing server/component 110 that implements a routing protocol to interact with the NAT associated with the client computing device 102. For example, with respect to the STUN protocol, the connection service 112 can use the public IP address of the client computing device 102, obtained from the routing server/component implementing the STUN protocol to identify an API-based connection for the client computing device 102 and the target computing device 106. Or as another example, with respect to the TURN protocol, the connection service 112 can use the allocated IP address of the client computing device 102, obtained from the routing server/component implementing the STUN protocol to identify an API-based connection for the client computing device 102 and the target computing device 106. With these various connections identified by the routing server/component 110 and the respective determined routing paths, the routing server/component 110 can transmit a connection processing result that includes the possible identified connections with the possible determined routing paths.

Accordingly, at (5), the connection service 112 transmits a connection processing result to the client computing device 102. The connection processing result can include at least one identified connection containing the determined connection socket in the public addresses for both the client computing device 102 in the target computing device 106. The connection process can also include at least one determined routing path, as was determined by the routing server/component 110 at (2). Generally, the connection processing result can be a WebRTC answer. The answer can include various parameters including, but not limited to: a type of answer, overrides to the buffer at the client computing device for both transmitting and receiving, of the data flow to be connected, or a parameter indicating that a buffer is to be emptied. For example, a protocol may specify that an answer, encapsulating a WebRTC answer, include: sdp_property, sdpType_property, sctpSendBuffer_property, sctpReceiveBuffer_property, and sctpAlwaysDry_property. An sdp_property can be a string representation of a WebRTC SDP answer. An sdpType_property can be a string representation of the SDP answer type. An sctpSendBuffer_property can be an integer representing a buffer size. If the target device supports overriding its SCTP send buffer size, it is advised to override the buffer size to at least this value. An sctpReceiveBuffer_property can be integer representing a buffer size. If the target device supports overriding its SCTP receive buffer size, it is advised to override the buffer size to at least this value. An sctpAlwaysDry_property can be a Boolean value. If the target device supports overriding its data channel send behavior and this value is true, it should begin draining the WebRTC send buffer into its SCTP send buffer upon receipt of any SCTP stream ACK.

FIG. 4B is a block diagram of the network topology of FIG. 1 illustrating processing of a connection processing result by a client computing device to select a routing path for an identified connection. At (6), the client computing device 102 transmits a client identifier and the connection processing result to the target computing device 106 to facilitate forming a connection for transmitting a data flow. The client identifier can be an identifier indicating that the client computing device 102 is a candidate for connection to the target computing device 106. For example, the client identifier can be an Interactive Connectivity Establishment ("ICE") identifier, also referred to as ICE candidate. For example, a protocol may specify that ICE candidate, encapsulating a SDP ICE candidate, include: sdp_mid_property, sdp_mline_index_property, and sdp_property. An sdp_mid_property can be a string identifying the connection to which the ICE candidate is associated. An sdp_mline_index_property can be an integer indicating the zero-based m-line index in the SDP. An sdpproperty can be a string representation of the SDP ICE candidate. Generally, the offer, answer, and ICE candidate messages can be sent as Unicode Transformation Format-8 (UTF-8) encoded JavaScript® Object Notation (JSON). The type of message is stored as a string property under the root object's "type" metadata.

At (7), the target computing device 106 transmits API level routing information to the client computing device 102. The target computing device 106 can have a list of candidates for connections. With the client identifier and connection processing result received from the client computing device 102, the target computing device 106 may add the client identifier to the list of candidates for connections. The target computing device 106 can determine that the connection processing result indicates a connection can be formed with the client computing device 102, and, subsequently transmit API-level routing information that indicates the client identifier of the client computing device 102 has been selected by the target computing device 106 for a connection. In various implementations, API-level routing information can be transmitted using the WebRTC API, in which the client identifier can be referred to as an ICE candidate. Viewed from this WebRTC implementation perspective, the process depicted at (6) and (7) can be referred to as an ICE negotiation, or ICE "trickling" process.

Continuing in the depicted embodiment of FIG. 4B, if the target computing device 106 selects the client computing device 102 for the connection, at (8), the client computing device 102 can select a routing path to form a connection between the client computing device 102 and target computing device 106. For example, a connection can be formed via the connection socket determined at the routing server/component 110. As has been described, various routing paths are available for selection, as part of the connection processing result transmitted from the routing server/component 110. The client computing device 102 can select the routing path that will be used to connect the client computing device 102 and the target computing device 106. In one embodiment, as a protocol may specify, once ICE candidates have been exchanged, the WebRTC connection can be established. Both the client computing 102 and target computing device 106 may disconnect from the connection service 112 and communicate over the control plane to use a WebRTC data channel.

As another example of the client computing device 102 selecting the routing path to form a connection, a connection may require that various routing service/components 110 are used to transmit an API level based data flow. The client computing device 102 can determine that the routing path used at those various routing service/components 110 will be the routing path selected. As yet another example, the client computing device 102 may continue to transmit additional API-level connection requests for additional data flows to the target computing device 106. To accomplish additional data flows, the client computing device 102 can use additional routing server/components 110 to establish the API level based connection, with the additional routing server/components 110 implementing the relevant routing protocol, as designated by the selected routing path. Accordingly, the connection service 112 can select a routing path for subsequent connection requests by the client computing device 102.

As described with respect to FIG. 4A-4B, the client computing device 102 utilizes the connection service 112 at the API-level to identify and configure the connection for a real-time, interactive, or streaming data flow transmission between the client computing device and the target device.

Figure 4C:
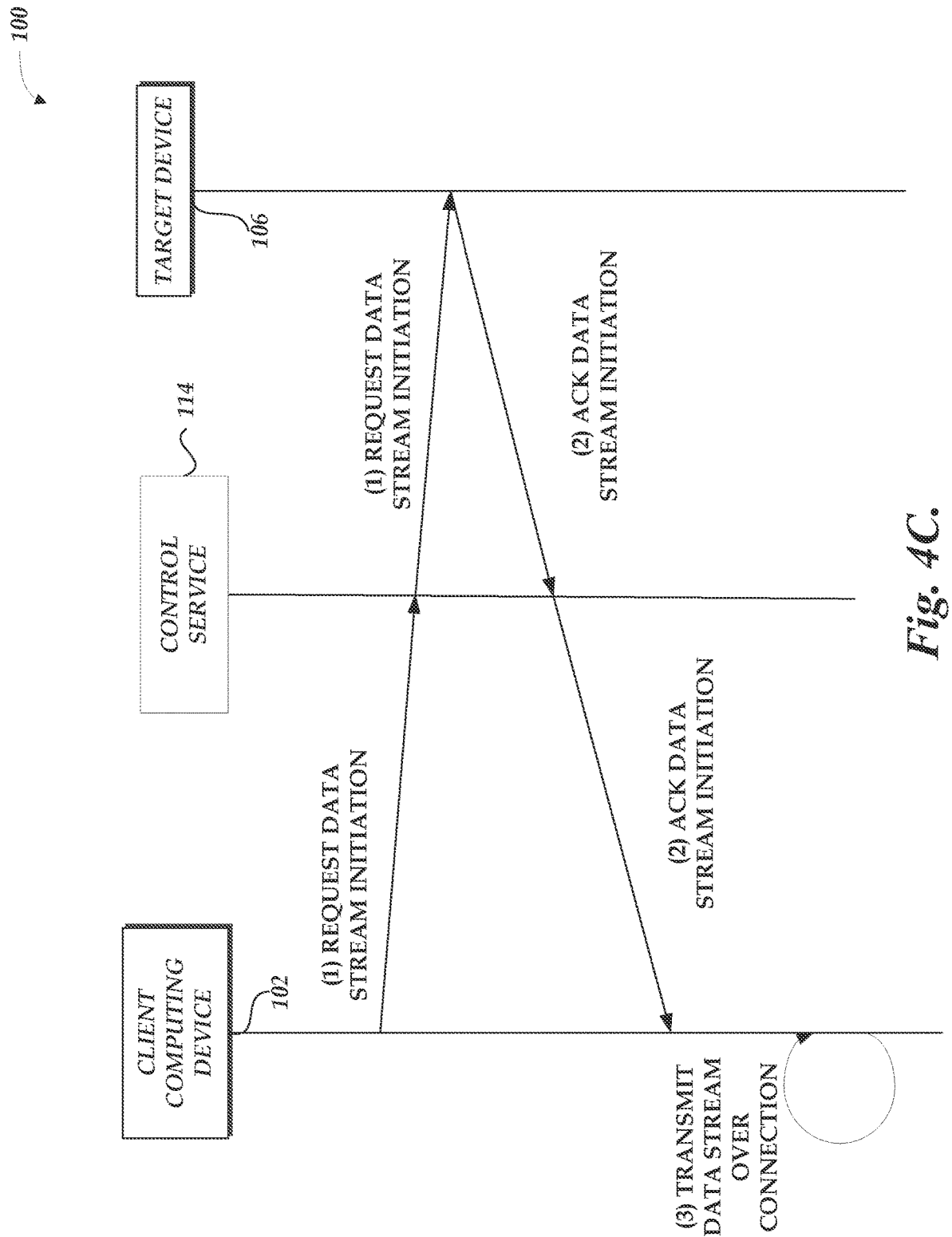
FIG. 4C is a block diagram the network topology of FIG. 1 illustrating transmission of and relaying of a data flow initiation request from a client computing device by a routing/server component in the network topology.

FIG. 4C is a block diagram the network topology of FIG. 1 illustrating transmission of and relaying of a data stream initiation request from a client computing device 102 by a routing/server component 110 in the network topology 100. As described with respect to FIG. 4C, a data flow is illustrated as a data stream. The data stream can corresponds to an implementation utilizing the WebRTC protocol for an API-level based connection, with data streams implemented by the Stream Control Transport Protocol ("SCTP"). Accordingly, TCP packets or UDP datagrams can be transmitted over the data stream via the connection. Once a connection has been identified as described with respect to FIG. 4A, the control service 114 can use a control plane or control layer 2 control access to that connection. For example, the control service 114 can determine whether data will be encapsulated in TCP packets or whether data will be encapsulated in UDP datagrams. The control service 114 can use parameters from requests and acknowledgments transmitted within the control plane to determine whether TCP or UDP is a preferred mode of data transmission over the connection.

As an illustrative example of the control service 114 using the control plane, at (1), the client computing device 102 and send data stream initiation request to the target computing device 106. The control service 114 can inspect the request to determine whether parameters indicate specific TCP ports for either the client computing device 102 or the client computing device 106. Such a request can also include host names or data stream names of reliable connections. Additionally, the control service 114 can relay the data stream initiation request to the target computing device 106. For example, the control service 114 may relay the data stream initiation request via one or more routing server/components 110 to the target computing device 106. In various embodiments, this relaying can be viewed as routing the request to initiate the data stream, and can be routed according to the determined routing mode, as determined by the connection service 112. For example, a protocol may specify that the data stream initiation request be referred to as a TCPStart for transmitting TCP data. The TCPStart can indicate that a particular data channel should be associated with a new socket connection; and that the target computing device should validate the outgoing connection (e.g., see if the hostname resolves to a permitted IP range) and start an outbound tunnel. The TCPStart can include: channel, host, and port. A channel can be a string name of one of the client computing device's TCP tunnels. A host can be a string hostname (or IP address in lexical form) to connect, and resolved by the target computing device's DNS stack. A port can be an integer TCP port for connection.

At (2), in response, the target computing device 106 can transmit a data stream initiation acknowledgment ("ACK") to the client computing device 102. Such an acknowledgment can include a data stream name sent originally by the client computing device 102 in the request to initiate the data stream. Again, the control service 114 can relay the data stream initiation acknowledgment to the target computing device 102. In various embodiments, this relaying can be accomplished through one or more of the routing server/components 110. At (3), the client computing device 102 forms the connection with the target computing device 106, having received the acknowledgment of the data stream initiation, and begins to transmit the data stream over the connection. As described herein, the connection he a variety of connections and can be routed in a variety of ways to the target computing device 106, thereby accomplishing real time data streams to the target computing device 106 via a data stream. For example, a protocol may specify that the data stream initiation ACK be referred to as a TCPStartACK. The TCPStart can acknowledge that the channel has been associated with a particular TCP connection. The TCPStartACK can include a channel. A channel can be a string name of the channel in the corresponding TCPStart message. A host can be a string hostname (or IP address in lexical form) to connect, and resolved by the target computing device's DNS stack. A port can be an integer TCP port for connection. Once a data channel has been reserved using the TCPStart/TCPStartACK exchange, that channel is considered "bound" to a socket pair. All data received over the data channel is considered "received" for metrics purposes, and is then sent to the local socket endpoint. In various embodiments, all data received over local socket endpoint is considered "sent" for metrics purposes, and is then sent over the data channel. There are no in-band control messages. If either peer closes its local socket, a TCP END/TCP ENDACK exchange begins on the control channel, as is described further below.

Control service 114 can determine the transmission parameters for the data stream. In various embodiments, the control service 114 may be implemented across several routing server/components that can vary the parameters of the data stream as data is communicated via the network topology 100 to the target computing device 106. For example, in one embodiment, the client computing device 106 can transmit a TCP END request, indicating to the control service 114 that TCP packets should not be transmitted on the data stream. Such a request can be received at a particular routing server/component 110, and then processed at another routing server/component 110 also having access to the control service 114 that implements the TCP END request. The TCP END request can indicates that a WebRTC channel should be unlinked from its socket. The TCP END request can include a channel. The channel can be a string name of the channel being "closed." In various embodiments, the WebRTC data channel is not actually closed, but logically ended. Some implementations can further include a TCP ENDACK message that can indicate that the WebRTC channel has been fully unlinked. The TCP ENDACK message can include a channel. The channel can be a string name of the channel in the corresponding TC END message, and indicate that the WebRTC channel can now be returned to the connection pool.

Figure 5:
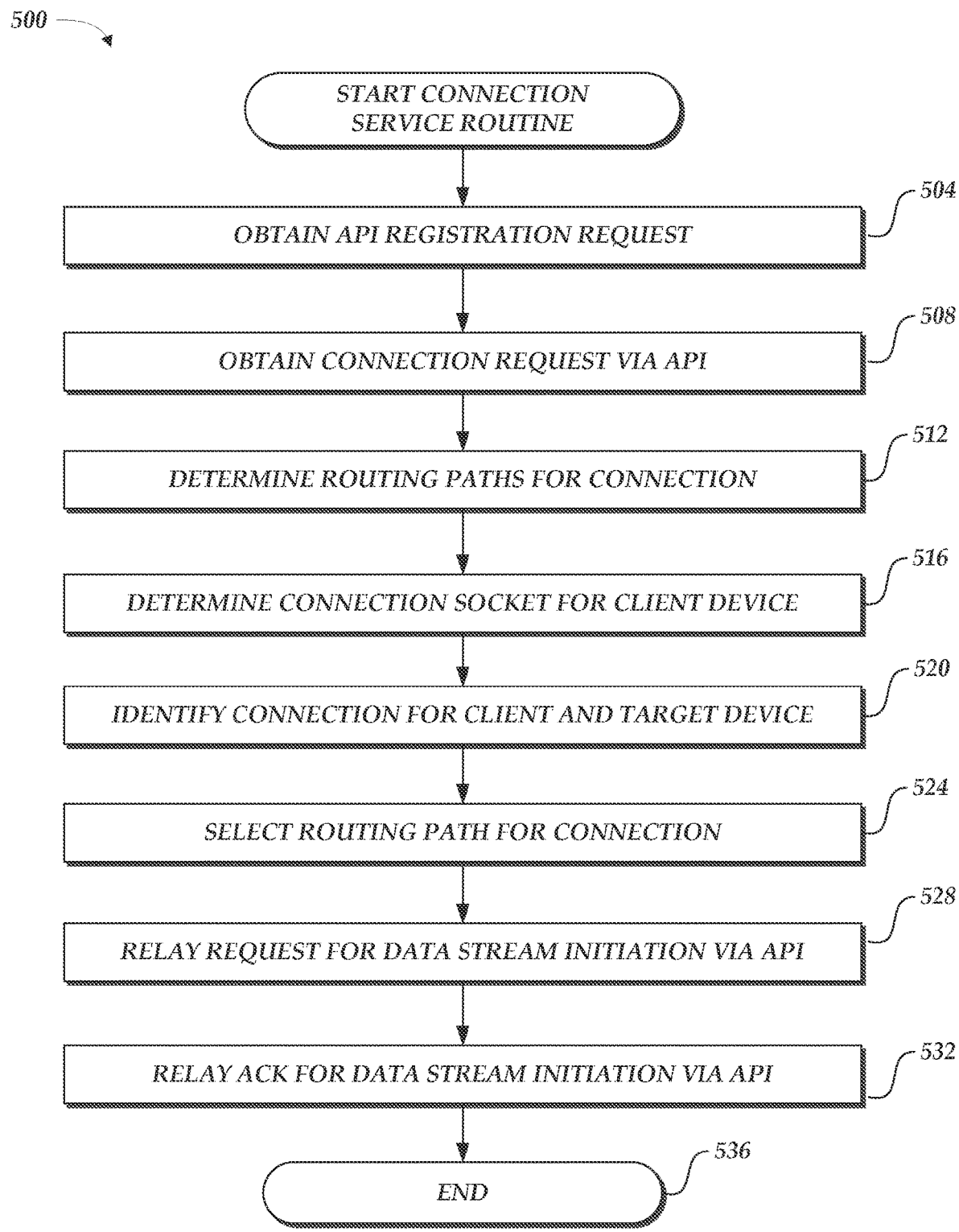
FIG. 5 is a flow diagram of an illustrative connection service routine implemented by a connection service.

FIG. 5 is a flow diagram of an illustrative connection service routine implemented, in part, by a connection service. The connection service can be a connection service as described with reference to the connection service in network topology 100. Routine 500 begins at block 504. At block 504, the connection service receives an API registration request, which can be received as discussed above with reference to FIG. 3 at (1). At block 508, the connection service obtains a connection request via the API, which can be received as discussed above with reference to FIG. 4A at (1). At block 512, the connection service determines a routing path for the connection, which can be received as discussed above with reference to FIG. 4A at (2). At block 516 and, the connection service determines a connection socket for the client computing device, which can be determined as discussed above with reference to FIG. 4A at (3). At block 520, the connection service identifies a connection for the client computing device and the target computing device, which can be identified as discussed above with reference to FIG. 4A at (4). At block 524, a client computing device 102 selects a routing path for the connection, which can be selected as discussed above with reference to FIG. 4B at (8). At block 528, the connection service relays a request for data flow initiation via the API, which can be relayed as discussed above with reference to FIG. 4C at (1). At block 532, the connection service relays an acknowledgement for data flow initiation via the API, which can be relayed as discussed above with reference to FIG. 4C at (2). Thereafter, the flow ends at block 536.

In various embodiments, routine 500 may be performed a connection service. In other embodiments, a physical computing device with computer-executable instructions may cause the computing device to perform routine 500. In some embodiments of the routine 500, elements may occur in sequences other than as described above. For example, in some embodiments, the connection service may not obtain an API registration request at block 504 if the client computing device is already registered with session credentials. In such a case, API session credentials may be included in the connection request received at block 508. One skilled in the art will appreciate that additional variations are possible and within the scope of the present disclosure.

Figure 6:
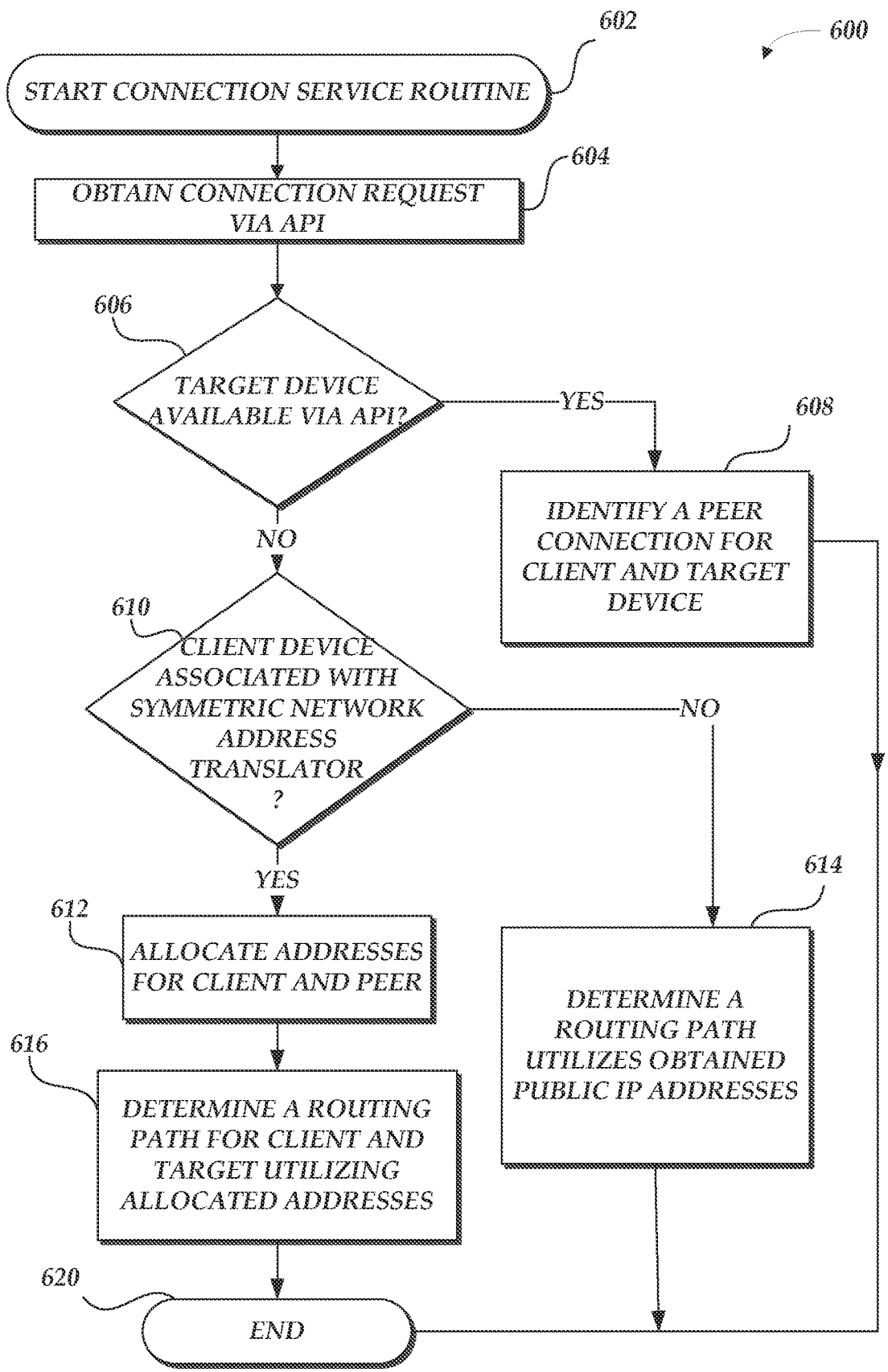
FIG. 6 is a flow diagram of an illustrative connection service implemented by a connection service.

FIG. 6 is a flow diagram of an illustrative connection service routine implemented by a connection service. The connection service can be a connection service as described with reference to the connection service 112 in network topology 100. Routine 600 begins at block 604. At block 604, the connection service obtains a connection request via the API, which can be received as discussed above with reference to FIG. 4A at (1).

At decision block 606, the connection service 112 determines whether the target computing device is available via the API. For example, the connection service determines whether public IP addresses are available for both the target computing device in the client computing device. Determining whether a target device is available via the API can be determined as discussed above with reference to FIG. 4A at (2). If a target device is available via the API, the flow proceeds to block 608. At block 608, the connection service identifies that the connection for the client computing device and the target computing device is a peer connection using a peer to peer routing path. For example, the client computing device and the target computing device can set up a WebRTC connection using a peer-to-peer framework. Thereafter, the flow ends at block 620.

If however, at block 606, the connection service determines that the target device is not available via the API, the flow proceeds to decision block 610. For example, the connection service may not have obtained API level routing information from the target computing device or the client computing device to identify or establish a connection. At decision block 610, the connection service determines whether the client computing device is associated with a symmetric network address translator. If the client computing device is not associated with a symmetric network address translator, the flow proceeds to block 614. At block 614, the connection service determines a routing path for the connection that can utilize an obtained public IP address for the client computing device. For example, as discussed above with reference to FIG. 4A at (2), the connection service can use the STUN protocol to obtain a public IP address for client computing device. In such a case, the connection service can further determine that the routing path may be a routing path that interacts with an arbitrary NAT.

If however, at block 606, the connection service determines that the client computing device is associated with a symmetric network address translator, the flow proceeds to block 612. At block 612, the connection service can request that the routing server/component implement the TURN protocol to allocate public addresses for either the client computing device and the target computing device, or both. For example, as discussed above with reference to FIG. 4A at (2), the connection service can use the TURN protocol to allocate a public IP address for client computing device. Similarly, the connection service can use the TURN protocol to allocate a public IP address for a target computing device. In such a case, the target computing device can now be referred to as a peer computing device. The flow proceeds to block 616. At block 616, the connection service determines the routing path for the connection can utilize the allocated public IP addresses. The connection service can further determine that the routing path may be a routing path that interacts with a symmetric NAT.

In various embodiments, routine 600 may be performed a connection service 112. In other embodiments, a physical computing device with computer-executable instructions may cause the computing device to perform routine 600. In some embodiments of the routine 600, elements may occur in sequences other than as described above. One skilled in the art will appreciate that additional variations are possible and within the scope of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a client computing device comprising one or more processors configured with processor-executable instructions to perform operations comprising establishing real time communications with a target computing device; and
   a set of intermediate computing devices, wherein individual intermediate computing devices comprise one or more processors configured with processor-executable instructions comprising a connection service and configured to:
      receive application-programming interface-based ("API-based") connection requests for session registration of the client computing device and the target computing device, wherein individual API-based connection requests include at least one offer parameter corresponding to a buffer associated with a data flow;
      generate corresponding session credentials for the client computing device and the target computing device;
      receive, from the client computing device, an API-based connection request, the API-based connection request comprising at least one offer parameter corresponding to a buffer associated with a data flow;
      obtain API-based routing information regarding the client computing device;
      determine that the API-based connection request and the API-based routing information do not include an externally addressable network address of the client computing device;
      determine, at the intermediate computing device based at least partly on the API-based routing information, that a network address translator ("NAT") associated with the client computing device corresponds to a symmetric NAT; and
      transmit, at an API-level, a connection processing result comprising the determination regarding the NAT to the client computing device, the connection processing result including a determined routing path from a plurality of available routing paths based on implementing at least one of a Traversal Using Relays around NAT ("TURN") protocol or Session Traversal Utilities for NAT (STUN) protocol STUN protocol to obtain an externally accessible network address, wherein the client computing device is further configured to:
- select a peer-to-peer routing path corresponding to a symmetric NAT traversal protocol for a connection between the client computing device and the target computing device in accordance with the connection processing result;
- transmit, to the target computing device, a data stream initiation request via the selected peer-to-peer routing path;
- receive, from the target computing device, a data stream initiation acknowledgement via the selected peer-to-peer routing path; and
- initiate transmission of the data stream to the target computing device via the selected peer-to-peer routing path.

2. The system of claim 1 further configured to:
- allocate, at the intermediate computing device, a connection socket for the client computing device and the target computing device, the connection socket comprising a communication port and a corresponding externally addressable network address for the client computing device; and
- determine, at the intermediate computing device, that a routing path for a connection between the client computing device and the target computing device is associated with a routing path for interactions with a symmetric NAT, wherein the routing path is associated with a routing protocol utilizing the allocated connection socket.

3. The system of claim 1, wherein the symmetric NAT traversal protocol corresponds to a Traversal Using Relays around NAT (TURN) protocol.

4. A computer-implemented method for determining a routing path of a connection, the method comprising:
- receiving an application programming interface-based ("API-based") connection request from a client computing device, the received API-based connection request comprising at least one offer parameter corresponding to a buffer associated with a data flow;
- determining, based at least in part on the API-based connection request, at least one routing path from a plurality of available routing paths for routing a data flow via intermediate computing devices between a client computing device and a target computing device, wherein determining the routing path from the plurality of available routing paths includes determining that the API-based connection request and API-based routing information do not include an externally accessible network address for the client computing device and implementing at least one of a Traversal Using Relays around NAT ("TURN") protocol or Session Traversal Utilities for NAT (STUN) protocol STUN protocol to obtain an externally accessible network address; and
- transmitting an API-based connection processing result regarding the determined routing path, the API-based connection processing result comprising an indication that the client computing device is to select a peer-to-peer routing path for the data flow in accordance with the determined at least one routing path,
- wherein the routing path for interactions with a symmetric network address translator ("NAT") corresponds to a Traversal Using Relays around NAT ("TURN") protocol, and wherein the routing path for interactions with a NAT that is not a symmetric NAT corresponds to a Session Traversal Utilities for NAT ("STUN") protocol, and
- wherein the API-based connection processing result enables the client computing device to:
  - transmit, to the target computing device, a data stream initiation request via the selected peer-to-peer routing path;
  - receive, from the target computing device, a data stream initiation acknowledgement via the selected peer-to-peer routing path; and
  - initiate transmission of the data stream to the target computing device via the selected peer-to-peer routing path.

5. The computer-implemented method of claim 4, wherein determining the routing path from the plurality of available routing paths comprises:
- determining that the target computing device is available to receive a data flow via an API-based transmission, the data flow defined in terms of a communication port and a network address;
- determining that the data flow includes an externally addressable network address; and
- identifying the peer-to-peer routing path to route traffic between the client computing device and the target computing device.

6. The computer-implemented method of claim 4, wherein determining the routing path from the plurality of available routing paths comprises:
- determining that the target computing device is available to receive a data flow via an API-based transmission, the data flow defined in terms of a communication port and a network address; determining that the data flow does not include an externally addressable network address of the client computing device; and
- implementing the routing path to obtain an externally addressable network address for the client computing device.

7. The computer-implemented method of claim 4 further comprising:
- transmitting, via at least one intermediate computing device, an API-based request for initiation of a data flow comprising data encapsulated with TCP to the target computing device; and
- transmitting, via the at least one intermediate computing device, an API-based acknowledgment for initiation of the data flow from the target computing device to the client computing device.

8. The computer-implemented method of claim 4 further comprising:
- transmitting, via at least one intermediate computing device, an API-based request for initiation of a data flow comprising datagrams of UDP to the target computing device; and
- transmitting, via the at least one intermediate computing device, an API-based acknowledgment for initiation of the data flow from the target computing device to the client computing device.

9. The computer-implemented method of claim 4 further comprising:
- receiving API-based requests for session registration from the client computing device;

generating API-based session credentials to identify an API-based session; and transmitting API-based session registration information regarding the API-based session to the client computing device.

10. The computer-implemented method of claim 9 further comprising:

identifying an additional intermediate computing device including the API-based session credentials; and wherein determining the routing path from the plurality of available routing paths comprises determining that the routing of the data flow via the intermediate computing devices includes the identified additional intermediate computing device, as a node of the connection.

11. The computer-implemented method of claim 10, wherein each of the intermediate computing devices, including the identified additional intermediate computing device, is associated with a service functionality.

12. The computer-implemented method of claim 4, wherein the API-based connection request corresponds to a Web Real Time Communications ("WebRTC") request associated with the WebRTC API protocol.

13. A non-transitory computer-readable storage medium including computer-executable instructions:

that, when executed by a computing device associated with one or more client computing devices, cause the computing device to:

receive an application-programming interface-based ("API-based") connection request, the API-based connection request comprising at least one offer parameter corresponding to a buffer associated with a data flow transmission for a client computing device;

determine a routing path from a plurality of available routing paths for a connection based at least partly on the API-based connection request, wherein determining the routing path from the plurality of available routing paths includes determining that the API based connection request and API-based routing information do not include an externally accessible network address for the client computing device and implementing at least one of a Traversal Using Relays around NAT ("TURN") protocol or Session Traversal Utilities for NAT (STUN) protocol STUN protocol to obtain an externally accessible network address;

select a peer-to-peer routing path from a plurality of available routing paths for a connection across intermediate computing devices, the connection associated with the data flow transmission for the client computing device, wherein the plurality of available routing paths include two or more of peer-to-peer routing paths, a routing path for interactions with a network address translator ("NAT"), and a routing path for interactions with a symmetric NAT; and transmit an API-based connection processing result comprising the selected peer-to-peer routing path to the client computing device, wherein the routing path for interactions with a symmetric NAT corresponds to a Traversal Using Relays around NAT ("TURN") protocol, and wherein the routing path for interactions with a NAT that is not a symmetric NAT corresponds to a Session Traversal Utilities for NAT ("STUN") protocol, and wherein the API-based connection processing result enables the client computing device to:

transmit, to a target computing device, a data stream initiation request via the selected peer-to-peer routing path;

receive, from the target computing device, a data stream initiation acknowledgement via the selected peer-to-peer routing path; and initiate transmission of the data stream to the target computing device via the selected peer-to-peer routing path.

14. The non-transitory computer-readable storage medium of claim 13 further configured to:

determine that a network address translator associated with the client computing devices corresponds to a symmetric NAT;

allocate an externally accessible network address for the client computing device.

15. The non-transitory computer-readable storage medium of claim 14 including further computer-executable instructions that, when executed by the computing device, cause the computing device to determine that the routing path for the connection across the intermediate computing devices corresponds to the routing path for interactions with a symmetric NAT.

16. The non-transitory computer-readable storage medium of claim 13, wherein the data flow transmission is associated with a connection service implementing the Web Real Time Communications ("WebRTC") API protocol.

17. The non-transitory computer-readable storage medium of claim 16, wherein the data flow transmission is associated with a resource, and wherein the resource corresponds to at least one of a RDP session, a video conference, or a voice conference.

* * * * *